Patented May 26, 1936

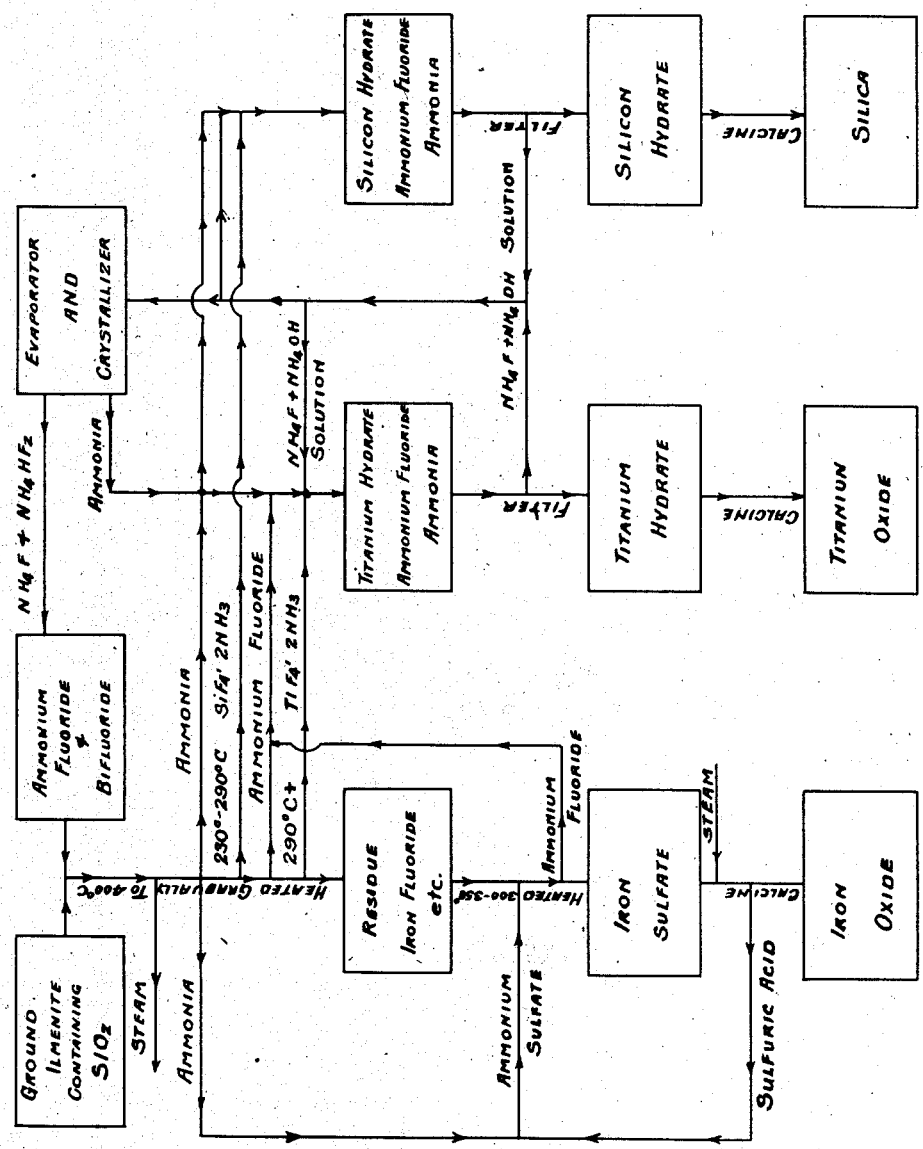

2,042,434

UNITED STATES PATENT OFFICE 2,042,434

MANUFACTURE OF TITANIUM COMPOUNDS

Svend S. Svendsen, Madison, Wis., assignor, by mesne assignments, to Burgess Titanium Company, a corporation of Delaware Application May 27, 1932, Serial No. 614,043
In Norway June 9, 1931

43 Claims. (Cl. 23—202)

This invention relates to the production of titanium oxide from titanium-containing materials, particularly titanium oxide minerals or compounds such as ilmenite or rutile, by processes wherein the titanium of such compounds is converted into complex fluoride compounds, as more fully hereinafter set forth.

In accordance with the present invention the titanium content of the mineral or compound may be separated from other metallic constituents thereof by conversion into and separation as a complex titanium fluoride compound. Silicon present is also vaporized as a fluoride compound, but as the silicon and titanium compounds are dissimilar in certain physical and chemical characteristics, they may be readily separated. For example, silicon tetrafluoride is a gas at room temperatures whereas titanium tetrafluoride boils at a temperature of about 290° C. The vaporization temperatures of the diammino-tetrafluorides of silicon and of titanium lie about 100° C. apart. Silicon tetrafluoride and its ammino compound are decomposed by water and the silica is completely precipitated by the addition of a stoichiometrically equivalent amount of ammonia, whereas the corresponding titanium compounds are water soluble without decomposition and the titania precipitated only by the addition of an excess of ammonia.

In operating in accordance with the present invention, I subject the titanium-containing material to the action of reactive fluoride compounds, thereby forming titanium fluorine compounds. While the conditions of operation may be such that non-volatile titanium fluorine compounds are formed, I prefer to so conduct the operation as to form a volatilization titanium tetrafluoride compound and may subsequently effect its vaporization.

I have found that it is possible to control the conditions of reaction so that the primary titanium fluorine compound formed is of a complex type as hereinafter set forth and such that its titanium content is, on heating, substantially volatilizable, or it is of a different type due to presence of water in the primary stage or to a reaction with an oxygen compound as is more fully explained hereinafter. Such reactive oxygen compounds are, for instance, metallic oxides present during the vaporization of the titanium fluorine compound. In the following description I have set forth conditions for the formation and separation of the titanium content of the material in connection with the formation of either type of primary compound.

In carrying out the invention, I prefer to maintain conditions under which substantially complete conversion and separation of the titanium content of the mineral may be effected. In the treatment of a titanium oxide compound with a reactive fluoride, however, titanium fluorine compounds may form, from which complete vaporization of the titanium may not be effected on further heating. For instance, if the reactive fluoride is added to a titanium oxide compound heated excessively, say to or near the temperature at which the volatile titanium fluorine compound is vaporized, or if the reactive fluoride is mixed with a titanium oxide compound at a lower temperature and then heated to or near the vaporization temperature of the volatile titanium fluorine compound before substantial completion of the conversion of the titanium oxide compound into fluorine compounds, or if insufficient ammonium fluoride is used non-volatile titanium fluorine compounds will form to a greater or less extent. Reactive oxygen compounds are here present during the formation and vaporization of the titanium fluorine compound.

A titanium fluorine compound, which on further heating, leaves non-volatile titanium fluorine compounds, may also form at a temperature substantially below the vaporization temperature of the volatile titanium fluorine compound if a large excess of the reactive fluoride is present in a sintered or molten state or if liquid water is present; for instance, if ammonium fluoride in a quantity sufficient for the reaction is added in one portion to the titanium containing material and the mixture heated. Apparently a titanium oxyfluoride compound is formed under these conditions.

The titanium fluorine compound formed by reaction of a reactive fluoride, such as ammonium fluoride, on a titanium oxide compound under proper conditions, with ammonium fluoride in excess and, for example, gradually added at a temperature between about 110° C.–250° C., contains appreciably more fluorine relative to titanium than is indicated by the formula: $TiF_4$. It is probably a complex titanium tetrafluoride-ammino-ammonium fluoride compound:

$$TiF_4.xNH_3.yNH_4F.$$

To secure substantially complete conversion of the titanium oxide into a primary compound having its titanium fluoride content substantially completely vaporizable, I have found it desirable that ammonium fluoride be added to the titanium oxide compound in considerable excess of the quantity theoretically required by stoichiometrical calculation for the complete conversion of the material into fluorides. For instance, for one molecule of titanium oxide: $TiO_2$, 4 molecules of ammonium fluoride are required stoichiometrically as shown in Equation (1), but I prefer to employ at least 6 molecules of ammonium fluoride as shown in Equation (2), and in general considerably more.

(1) $TiO_2 + 4NH_4F = TiF_4.2NH_3 + 2H_2O + 2NH_3$ (2) $TiO_2 + 6NH_4F = TiF_4.xNH_3.yNH_4F + 2H_2O + (4-x)NH_3 + (2-y)NH_4F$

The complex titanium tetrafluoride compound thus formed at below 250° C. apparently is the complex titanium tetrafluoride-ammino-ammonium fluoride compound $TiF_4.xNH_3.yNH_4F$. It is evidently not decomposed by water vapors at a temperature substantially below its vaporization temperature. It vaporizes and dissociates on further heating, forming ammonia, ammonium fluoride and titanium diamminotetrafluoride. I have found that such vaporization starts at a temperature below 300° C., apparently at about 290° C.

If ammonium fluoride is added to the titanium oxide compound in stoichiometric proportion (Equation (1)) there is a shortage of reactive fluoride caused by the formation of the complex titanium tetrafluoride compound of Equation (2) where $x$ is larger than 2. With further heating the undecomposed oxides apparently react with this complex titanium tetrafluoride compound to form a non-volatile titanium-fluorine compound, apparently an oxyfluoride compound. It is therefore essential under these conditions to eliminate oxygen compounds capable of reacting with the complex titanium tetrafluoride compound to form a non-volatile compound. Under some conditions, if liquid water is present during the fluoride formation or if water vapor or a metallic oxide is present during the vaporization of the complex tetrafluoride compound such non-volatile compounds also are formed.

By increasing the temperature of the reaction mixture to above the vaporization temperature of the complex titanium tetrafluoride compound, at least a part of the non-volatile titanium fluorine compounds decompose to form and volatilize some additional titanium tetrafluoride compounds. Varying proportions of non-volatile titanium-fluorine (probably oxyfluoride) residue containing ammonia and possibly an ammino compound, are left unvolatilized.

In operating in accordance with my invention, I subject the titaniferous material to the action of ammonium fluoride or of a reaction mixture capable of forming ammonium fluoride in proportions to secure the formation of a titanium-fluorine product capable of forming a complex titanium tetrafluoride compound, and preferably the complex titanium tetrafluoride compound previously described, the titanium content of which is substantially completely vaporizable as a tetrafluoride compound. The ammonium fluoride or a reactive mixture capable of producing it is supplied in proportions in excess of that required to react with the combined oxides of the material, and in an amount in sufficient excess of the stoichiometrical equivalent of the titanium content of the mineral as previously explained. Ammonium fluoride reacts with silica present to form volatile silicon diamminotetrafluoride and with metallic oxides to form fluorides. Suitable temperatures are employed to secure the desired reaction, and in general the temperatures used are above 100° C., in order that the reaction may take place in substantially dry state; that is, in the absence of liquid water. However, even at above 100° C. there are conditions under which there may be formed titanium-fluorine products of which only a part may be converted into volatilizable titanium tetrafluoride compounds on dissociation. I, therefore, prefer to further control the conditions as hereinafter set forth so that substantially all of the titanium content of the raw material is converted into fluorine compounds of substantially completely vaporizable titanium content. However, it is to be understood that my invention comprehends broadly the conduct of the process in such manner as to secure at least a partial ultimate conversion of the titanium compounds into volatile fluoride compounds.

I may use, as the reactive fluoride, either hydrofluoric acid, ammonium fluoride, ammonium bifluoride or a reaction mixture capable of producing such fluoride compounds, such as a mixture of sulfuric acid, sodium acid sulfate, a titanium sulfate compound, or ammonium sulfate with a metallic fluoride such as fluorspar. In general, I prefer to use ammonium fluoride, as it is regenerated in the process and also, through its use, it becomes possible to form the primary complex titanium tetrafluoride compound which is not reacted upon by the water vapors generated during its formation.

Although the primary reaction may be conducted at temperatures of 100° C. or even lower, at which temperatures water in liquid form is present, in the present embodiment of my invention I use temperatures such that the reaction mixture is maintained substantially dry; that is, so that the water formed by the reaction is generated in vapor form. This condition I designate hereinafter as "dry state". Thus I prefer to maintain a temperature of at least above about 110° C. to 120° C. during the reaction. Furthermore, to aid in maintaining a dry state, I may add the reactive fluoride employed gradually during the reaction. This avoids any possible accumulation of liquid water or sintering of the reactive fluoride. The temperature is preferably maintained below 300° C. and in general below 250° C. during formation of the primary complex titanium tetrafluoride compound, thereby avoiding substantial dissociation thereof during its formation. In general, I prefer to employ temperatures above 150° C., since at such temperatures, the reaction in the direction of the formation of the complex titanium tetrafluoride compound desired takes place at a more rapid rate and without requiring the grinding to excessive fineness of the reaction materals, and particularly the titanium ore. Any silica present is volatilized as silicon diamminotetrafluoride as the temperature is raised above 230° C., this compound being substantially entirely volatilized below 290° C.

After completing the formation of the desired primary complex titanium tetrafluoride compound, the temperature of the reaction mixture is raised to above 230° C. and in general above 290° C. When non-volatile titanium fluorine compounds are absent, temperatures of about 350° C. are found to be sufficient. Under these temperature conditions, the primary complex titanium tetrafluoride compound vaporizes and dissociates to form, with other products, the titanium diamminotetrafluoride.

The reaction residue, which may contain metallic fluorides, such as fluorides of iron, aluminum and the like, and may also contain unvolatilized titanium fluoride compounds, may be heated in an atmosphere of water vapor and ammonia, or water vapor alone; or a reactive sulfate, such as ammonium sulfate may be admixed therewith and the mixture heated, in order to remove the fluoride content of the residue. For example, by heating the residue of the reaction mixture with ammonium sulfate to reacting temperatures of about 300° C. to 350° C., the metallic fluorides present are decomposed, ammonium fluoride is formed and passes off as a vapor, and metallic sulfates remain. The titanium ores available usually have considerable iron present. This reaction therefore leaves ferrous sulfate (see Reaction 3) which may be decomposed by roasting in the presence of steam to form sulfuric acid and iron oxide. If any non-volatile titanium fluoride compound is present in the reaction residue, it likewise is decomposed under these conditions, the titanium being at least in part vaporized as a titanium amminofluoride.

(3) $FeF_2 + (NH_4)_2SO_4 = FeSO_4 + 2NH_4F$

The ammonium fluoride produced in the sulfate reaction may be employed to bring up the strength of the ammonium fluoride solution used in decomposing the titanium diamminotetrafluoride and any accompanying silicon diamminotetrafluoride, as hereinafter more fully set forth. Losses of ammonium fluoride which may occur may be made up by adding the desired amount of a mixture of fluorspar and ammonium sulfate or other reaction mixture capable of forming ammonium fluoride to the reaction residue during its decomposition by ammonium sulfate.

The volatilized titanium compounds comprising the diamminotetrafluoride formed during the described operations may be condensed and collected. They preferably are directly subjected while in vapor form to a treatment to precipitate the titanium as a titanium oxide compound. This is effected by reacting upon the titanium compounds, either after collection or in vapor form, with water and ammonia, the latter preferably in excess. I find that a denser titania precipitate may be secured from the decomposition of these titanium tetrafluoride compounds by employing, instead of water and ammonia, an ammoniacal solution of concentrated ammonium fluoride. By carrying out the decomposition at reduced temperatures, the density of the titania precipitate may be further increased.

By choosing as the titanium containing material an anhydrous titanium salt, such as the alkali or ammonium double sulfate and a metallic fluoride such as sodium fluoride, as the fluorine source, the vaporization of the titanium as a tetrafluoride compound may be accomplished, as illustrated in Equation (4).

(4) $Na_2Ti(SO_4)_3 + 4NaF = 3Na_2SO_4 + TiF_4$

By heating ammonium titanium sulfate with, for instance, calcium fluoride, titanium tetrafluoride is formed and vaporized together with ammonium fluoride, as illustrated in Equation (5).

(5) $(NH_4)_2Ti(SO_4)_3 + 3CaF_2 = 3CaSO_4 + TiF_4 + 2NH_4F$

If an alkali double sulfate is used in the reaction as in Equation (4), ammonium fluoride preferably is added to act as an intermediary between the metallic compounds to facilitate the reaction. A double fluoride compound of titanium and ammonium is apparently primarily formed. Since titanium tetrafluoride condenses to a liquid and is corrosive to metals it is desirable to form the non-corrosive diammino compound which condenses to a solid by carrying out Reactions (4) and (5) in the presence of ammonia gas.

The temperature at which the Reactions (4) and (5) takes place is below the dissociation temperature of the titanium sulfate compound, and preferably below about 400° C.

The present principal available sources of titanium oxide are ilmenite and rutile. Rutile is less reactive than ilmenite and requires a higher degree of pulverization than the latter, and preferably a preheating to above 1040° C. with sudden cooling to increase its reactivity.

The accompanying drawing is a flow sheet diagrammatically illustrating several embodiments of the invention.

The following is a specific example of one method for carrying out my invention, using ilmenite as the source of titanium oxide. However, it is to be understood that my invention is not limited to these specific details of this example:

The ore, preferably pulverized to a fineness such that at least 95% will pass through a 150 mesh screen, is heated, suitably in an enclosed, externally-heated furnace with suitable stirring mechanism, feeding devices and outlets for discharge of the vapors and residue. The temperature of the material is raised preferably to about 150-200° C. Ammonium fluoride crystals are gradually added in such a manner that at no time during the operation is there present in the reaction mass a substantial amount of free ammonium fluoride. This addition is usually made over a period of several hours. The total added fluoride is in the proportion of about 2 to 2½ parts by weight to 1 part of ore. The temperature is maintained preferably at about 150-200° C. during the reaction. The ammonia and water vapors evolved are collected.

After substantially complete conversion of the material into desired fluorine compounds at 150-200° C., distinguishable by a change of color of the powdery mass from black to grayish white, the temperature is raised to between 300° C. and 400° C., preferably to about 340-350° C. At this temperature the volatile fluorine compounds are vaporized. Toward the end of the reaction the temperature may be raised to about 400° C. or higher to dissociate titanium fluorine compounds that were not volatilized at the lower temperatures. The vapors evolved are collected. After the vapors have ceased to be evolved, ammonium sulfate is gradually added to dissociate the non-volatile fluoride residue. Ammonium fluoride passes off and metallic sulfates are formed. The temperature during the decomposition of the residue is preferably kept at about 300-350° C. Approximately 1 part by weight of ammonium sulfate for 1 part by weight of the original ore may be added. Any non-volatile titanium fluoride compound present is also dissociated by the sulfate and at least a part of its titanium content vaporized as diamminotetrafluoride. During this operation a mixture of fluorspar and ammonium sulfate may be added in a quantity sufficient to supply any deficiency of ammonium fluoride due to loss in the operations involving the decomposition of the volatilized fluoride compounds or in other stages of the process.

The furnace residue, consisting almost entirely of ferrous sulfate, may be roasted at a temperature of about 500° C. and the sulfuric acid regenerated in a way known to the art. This acid may be combined with ammonia produced in the preceding operations to form ammonium sulfate, which may be employed in a further dissociation of fluoride residue. The iron is recovered as iron oxide.

The ammonium sulfate used in the operation may also be regenerated by reacting ammonia, evolved during treatment of the ore or produced during other stages of the process, with iron sulfate, crystallized or in solution, derived from the residue.

If desired, the residue may be leached for the production of ferrous sulfate (copperas) instead of roasting it as above set forth.

The combined furnace vapors containing titanium tetrafluoride compounds, ammonium fluoride and ammonia are contacted with an aqueous solution of ammonia or preferably with an ammoniacal solution of ammonium fluoride in any suitable manner, for example, in a cooled scrubbing or spray tower. A cooled ammoniacal aqueous liquid is employed and the reaction mixture is cooled also during the reaction to below 34° C. to effect a complete precipitation, and preferably below 10° C. to increase the density of the precipitated titania.

The material discharged from the scrubber contains very fine particles of titania suspended in the ammonium fluoride solution. The more concentrated the fluoride content of the solution and the lower the temperature of the ammoniacal liquid in the scrubber, the denser is the titania precipitate.

The scrubbing liquid may be cooled and reused for reaction with the titanium tetrafluoride compounds to build up its concentration of titania and ammonium fluoride which are formed in the decomposition of the titanium tetrafluoride compounds. The titania may be filtered out and the liquid filtrate alone recirculated. After the desired concentration of ammonium fluoride has been reached, a part of the liquid from the scrubber may be removed, and filtered, while the remainder of the liquid is recirculated with the addition of the wash water from the titania precipitate to make up the loss in volume.

The portion of the withdrawn liquid from which the titania has been removed may be evaporated to crystallization of its ammonium fluoride content. The ammoniacal water vapor given off may be used to provide ammonia for the regeneration of ammonium sulfate. The ammonium fluoride recovered is available for use in the treatment of the titanium mineral.

The density of the recovered titania may be further increased by mechanical manipulation, for instance, by treatment of the titania filter cake in a ball mill.

If the titaniferous material contains silica and if a partial separation of this silica is desired, leaving a titania-silica mixture lower in silica than that secured by the treatment of the fluoride vapors as hereinbefore described, the mixed fluoride vapors containing both titanium and silicon diamminotetrafluorides, are collected separately from the ammonia vapors evolved in the first part of the operation and also from the ammonia vapors evolved in the ammonium sulfate treatment. These mixed ammino compounds are treated or washed in any suitable device or scrubber, with water or with a solution of ammonium fluoride, but which has not been made ammoniacal. I have named the silica which is thereby precipitated, "alpha" silica. This silica is filtered out and the filtrate, containing the dissolved titanium tetrafluoride compound together with ammonium fluoride and ammonium silicofluoride is then treated with ammonia. By keeping the temperature low during this treatment with ammonia and keeping the solution concentrated a dense, opaque silica, which I have named "beta" silica, is precipitated together with a dense titania. The "alpha" is translucent and has a high oil absorption and it is therefore desirable to conduct the operation in two steps as described. This method is preferred when a large amount of silica is present with the titanium ore, and may be used in the production of a silica-titania pigment of high tinting strength and hiding power, the silica acting as an extender though having considerable covering power in itself. If required, silicious material may be added to the titanium ore.

However for the production of this mixed pigment I prefer to produce and vaporize the silicon tetrafluoride compound separately from the titanium tetrafluoride compound. The vaporized compounds may then be mixed and treated as described, contacting either the vapor or the solid material with a non-ammoniacal aqueous solution. Or ammonium silico-fluoride may be produced separately and mixed with the titanium tetrafluoride compound in solid state and contacted with the ammoniacal liquor. Ammonium silicofluoride also may be added during the titania precipitation. The conditions as to temperature, salt concentration, etc., to be followed in order to obtain a dense, opaque titania precipitate also hold for the titania-silica precipitate.

If a silica-free titania is desired, the silicon and titanium-containing vapors from the furnace may be collected separately, for example, in the following manner:

The titanium and silicon content of the material treated is first converted into volatile tetrafluoride compounds as hereinbefore described. The temperature of the reaction mixture containing the volatile compounds, is then raised to about 230–290° C., preferably to about 270–290° C., at which temperature the silicon-tetrafluoride compound vaporizes as silicon diammino tetrafluoride. After removing the silicon the temperature is raised and the titanium tetrafluoride compound vaporized and subjected to treatment as hereinbefore described.

This application is a continuation in part of my prior application Serial No. 425,345, filed February 1, 1930, now Pat. No. 1,911,004 and Serial No. 425,671, filed February 3, 1930 now Pat. No. 1,959,747.

The term "volatile" and "non-volatile" are here meant to represent these properties within the temperatures involved.

In this application I make no distinction between ammonium fluoride and ammonium bifluoride, as both may be used. Likewise the normal ammonium sulfate and the ammonium bisulfate may be used.

I claim:

1. The method of producing titanium oxide from a titanium containing material which comprises heating said material with a reactive fluoride to form a volatile titanium tetrafluoride compound, vaporizing said titanium tetrafluoride compound and contacting said vaporized compound with an aqueous ammoniacal solution.

2. The method of producing titanium oxide which comprises subjecting titanium oxide-containing material to the action of a reactive fluoride under conditions to produce a titanium tetrafluoride compound of high fluorine content, heating the mixture to volatilize the resulting titanium tetrafluoride compound, and contacting said vaporized titanium tetrafluoride compound with an ammoniacal ammonium fluoride solution, whereby titania and ammonium fluoride are formed.

3. The method of producing titanium oxide from a titanium oxide mineral which comprises reacting upon the mineral with an excess of ammonium fluoride at a temperature above 110° C. and below 250° C., increasing the temperature to above 290° C., whereby volatile titanium tetrafluoride compounds are vaporized, and contacting the vapors with an ammoniacal solution of ammonium fluoride, thereby forming titania, and filtering said titania from the ammonium fluoride solution.

4. The method of producing titanium oxide which comprises treating a volatilizable titanium-fluorine-ammonia compound with water in the presence of ammonia.

5. The method of producing titanium oxide which comprises treating a volatilizable titanium-fluorine-ammonia compound with water in the presence of an excess of ammonia.

6. The method of producing titanium oxide which comprises treating a volatilizable titanium-fluorine-ammonia compound with water in the presence of ammonia while maintaining the treating liquid at a low temperature.

7. The method of producing titanium oxide which comprises treating a volatilizable titanium tetrafluoride compound with ammonia in the presence of a solution of ammonium fluoride.

8. The method of producing titanium oxide which comprises treating a volatilizable titanium tetrafluoride compound with ammonia in the presence of a concentrated aqueous solution of ammonium fluoride.

9. The method of producing a dense titanium oxide which comprises treating a volatilizable titanium tetrafluoride compound with a cold ammoniacal concentrated solution of ammonium fluoride and maintaining the temperature below 10° C., removing the titania from the fluoride solution by filtration, and milling the filter cake so produced.

10. The method of producing an intimate mixture of titanium oxide and silica from a titanium and silicon containing material which comprises heating said material, as herein described, with a reactive fluoride compound to form a mixture of volatile silicon tetrafluoride and titanium tetrafluoride compounds, vaporizing said tetrafluoride compounds, and contacting said mixed vaporized compounds with an aqueous ammoniacal solution.

11. The method of producing an intimate mixture of titanium oxide and a dense silica from a titanium and silicon containing material which comprises heating said material, as herein described, with a reactive fluoride compound to form a mixture of volatile silicon tetrafluoride and titanium tetrafluoride compounds, vaporizing said tetrafluoride compounds, and contacting said mixed vaporized compounds with water, removing the silica precipitated thereby, and contacting the residual solution with ammonia.

12. The method of producing an intimate mixture of titanium oxide and a dense silica from a titanium containing material which comprises heating said material, as herein described, with a reactive fluoride compound to form a volatile titanium tetrafluoride compound, vaporizing said tetrafluoride compound, and contacting said vaporized compound together with ammonium silicofluoride with an ammoniacal ammonium fluoride solution.

13. The method of producing an intimate mixture of titanium oxide and silica from a titanium and silicon containing material which comprises heating said material as herein described with a reactive fluoride compound to form a mixture of silicon tetrafluoride and titanium tetrafluoride compounds, subjecting said mixture to the action of an ammonium fluoride solution, removing the insolubles from said solution and subjecting the silicon and titanium compounds remaining in solution to the action of ammonia.

14. The method of producing an intimate mixture of titanium oxide and silica from a titanium and silicon containing material, which comprises treating said material as herein described with an excess of ammonium fluoride to form a mixture of silicon tetra-fluoride and titanium tetrafluoride compounds, subjecting said mixture to the action of water, removing the insolubles from the resulting solution and subjecting the silicon and titanium compounds in solution to the action of ammonia.

15. The method of producing silica and titanium oxide from a titanium and silicon-containing material which comprises heating said material with a reactive fluoride compound under conditions to form a mixture of volatile silicon tetrafluoride and titanium tetrafluoride compounds, vaporizing said tetrafluoride compounds, contacting the mixed vaporized compounds with an aqueous solution of ammonium fluoride, removing the silica precipitated thereby, and contacting the residual solution with ammonia.

16. The method of producing silica and titanium oxide which comprises forming and volatilizing a mixture of ammino-fluoride compounds of silicon and titanium, contacting said compounds with an aqueous liquid, separating the silica precipitate formed thereby, and contacting the residual solution with ammonia.

17. The step in the method of removing titanium from a titanium-containing material which comprises heating said material in the presence of ammonium fluoride.

18. The step in the method of removing titanium from a titanium-containing material which comprises mixing and heating said material with ammonium fluoride at a temperature sufficient to secure substantial dryness.

19. The step in the method of removing titanium from a titanium-containing material which comprises heating the titanium-containing material in the presence of ammonium fluoride at a temperature sufficiently high to maintain substantial dryness of the reaction mixture and below the volatilization temperature of the titanium fluorine compound formed.

20. In the method of removing titanium from a titanium-containing material, the step which comprises heating said material in the presence of ammonium fluoride in quantity sufficiently in excess of the stoichiometrical quantity so that substantially all of the titanium will be converted into titanium-fluorine-ammonia compounds.

21. In the method of removing titanium from a titanium-containing material, the step which comprises mixing and heating said material with an excess of ammonium fluoride at a temperature of above about 110–120° C.

22. The step in the method of removing titanium from a titanium-containing material which comprises heating said material in the presence of ammonium fluoride to a temperature above about 110–120° C.

23. In the method of removing titanium from a titanium-containing material, the step which comprises heating the titanium-containing material in the presence of ammonium fluoride at a temperature above about 110–120° C. and below the volatilization temperature of the titanium-fluorine compound formed.

24. In the production of titanium oxide, forming and contacting a titanium-ammino-fluoride compound with an aqueous solution, and contacting the resulting liquid with ammonia.

25. The method of producing titanium oxide which comprises heating a titanium-containing material with ammonium fluoride under conditions to form a titanium-ammonium-fluorine compound, subjecting said compound to the action of an aqueous liquid, separating the resulting solution and contacting ammonia therewith.

26. The method of producing titanium oxide, which comprises treating a titanium-containing material with ammonium-fluoride under conditions to form a titanium-ammonium-fluorine compound, subjecting said compound to the action, in aqueous solution, of ammonia in excess, whereby free ammonia is present throughout the precipitation reaction.

27. The method of producing titanium oxide which comprises treating titanium ammino tetrafluoride vapors with water in the presence of ammonia.

28. The method of producing titanium oxide which comprises contacting titanium ammino tetrafluoride vapors with water, thereby cooling said vapors, and causing reaction to form titanium oxide.

29. The method of removing titanium from a titanium containing material which comprises treating said material with a reactive fluoride to form a titanium tetrafluoride compound, and vaporizing said titanium tetrafluoride compound in the substantial absence of water vapors.

30. The method of removing titanium from a titanium oxide compound which comprises heating said compound with ammonium fluoride at a temperature sufficiently high to prevent the formation of liquid water in the reaction mass, and volatilizing titanium tetrafluoride compounds therefrom.

31. The method of removing titanium from a titanium oxide compound which comprises heating said compound with an amount of ammonium fluoride sufficient to substantially completely convert the titanium of said oxide compound into a titanium tetrafluoride ammino-ammonium fluoride compound, and volatilizing a titanium tetrafluoride compound therefrom.

32. The method of removing titanium from a titanium oxide compound which comprises gradually adding ammonium fluoride to the heated titanium oxide compound, and volatilizing titanium tetrafluoride compounds formed.

33. The method of removing titanium from a titanium oxide compound which comprises gradually adding ammonium fluoride to the oxide compound heated at a temperature of between about 110° C. and 250° C., and raising the temperature to volatilize the titanium tetrafluoride compounds thereby.

34. In the method of removing titanium from a titanium oxide compound comprising the heating of said compound with ammonium fluoride with the formation of a titanium tetrafluoride-ammino-ammonium fluoride compound, the step which comprises heating said titanium tetrafluoride compound to between about 290° C. and 400° C.

35. The method of producing a titanium tetrafluoride-ammonium fluoride-ammonia compound from a titanium oxide material which comprises admixing therewith ammonium fluoride in excess and maintaining a temperature sufficiently high to maintain substantial dryness but below the dissociation temperature.

36. The method of removing titanium from a titanium oxide compound which comprises heating said compound with ammonium fluoride and volatilizing the titanium tetrafluoride compound formed, and further heating the residue from said titanium tetrafluoride volatilization with ammonium sulfate.

37. The method of claim 17 in which ammonium sulfate is added to the reaction mass after volatilization of the volatile titanium tetrafluoride compounds and heated therewith at temperatures of 300° C. to 350° C.

38. The method of removing titanium from rutile which comprises heating the rutile to a high heat and suddenly cooling as herein described, heating the powdered rutile so treated with ammonium fluoride gradually added in excess at a temperature from 110° C. to 250° C. and raising the temperature of the reaction mass to above about 290° C.

39. In the removal of titanium from materials containing titanium oxide and silicious material the method which comprises subjecting said material to the action of a reactive fluoride under conditions to form tetrafluoride compounds of silicon and titanium, heating the mixture to a temperature to volatilize silicon fluoride compounds and below the volatilization temperature of the titanium tetrafluoride compounds and subsequently heating the remaining mixture to a temperature above the volatilization temperature of the titanium tetrafluoride compound, thereby vaporizing the volatile titanium tetrafluoride compounds.

40. In the removal of titanium and silicon from materials containing them in admixture, subjecting such materials to the action of ammonium fluoride in excess to form volatile silicon tetrafluoride compounds and normal titanium tetrafluoride compounds having a relative fluorine content higher than that of titanium tetrafluoride, maintaining a temperature below that of volatilization of the titanium tetrafluoride compounds and sufficiently high to volatilize silicon tetrafluoride compounds, and subsequently increasing the temperature of the residual mixture, thereby volatilizing titanium tetrafluoride compounds.

41. In the method of removing the titanium from rutile, preliminarily heating the rutile to a temperature above at least 1040° C. and rapidly cooling it.

42. As a new compound, a complex titanium tetrafluoride-ammino-ammonium fluoride compound of the general formula, $TiF_4 \cdot xNH_3 \cdot yNH_4F$, which dissociates on heating and volatilizing into a titanium ammino-tetrafluoride compound.

43. The cyclical process for treating titanium-bearing ores containing substantial quantities of iron, which comprises treating said ore with ammonium fluoride to form ammonia and fluoride compounds of titanium and iron, separating said compounds, contacting said titanium fluoride compound with ammonia released in said initial reaction to thereby form titanium hydrate and ammonium fluoride, separating said hydrate from said ammonium fluoride, treating said iron fluoride in the presence of water vapors to form iron oxide and hydrofluoric acid, contacting said hydrofluoric acid with ammonia formed in said initial reaction to thereby form ammonium fluoride, and treating further quantities of ore with said recovered ammonium fluoride.

SVEND S. SVENDSEN.

CERTIFICATE OF CORRECTION.

Patent No. 2,042,434.                                        May 26, 1936.

SVEND S. SVENDSEN.

It is hereby certified that error appears in the printed specification of the above numbered patent requiring correction as follows: Page 1, second column, line 25, beginning with the words "A titanium" strike out all to and including the syllable and period "ditions." in line 37, same page and column; page 2, second column, line 61, for "materals" read materials; page 4, second column, line 62, for "term" read terms; page 5, second column, line 58, claim 18, for "secure" read maintain; and line 63, claim 19, for "maintain" read secure; page 6, first column, line 18, claim 24, for "solution" read liquid; and line 19, same claim, for "liquid" read solution; same page, second column, strike out lines 30 to 37 inclusive, comprising claim 38; and for the claim numbers "39", "40", "41", "42", and "43" read 38, 39, 40, 41, and 42; and that the said Letters Patent should be read with these corrections therein that the same may conform to the record of the case in the Patent Office.

Signed and sealed this 1st day of September, A. D. 1936.

(Seal)
                                             Leslie Frazer
                                    Acting Commissioner of Patents.